Aug. 24, 1954 W. J. SCHIESER ET AL 2,687,272
AUTOMATIC CONTAINER FILLING AND WEIGHING APPARATUS
Filed June 26, 1948 3 Sheets-Sheet 1

Inventors
Warren J. Schieser &
John F. Kelley
By
W. S. McDowell
Attorney

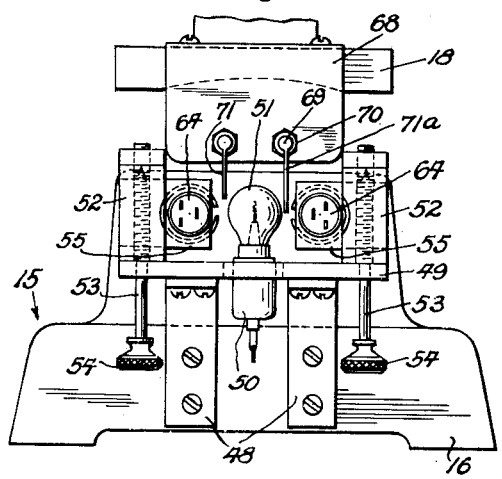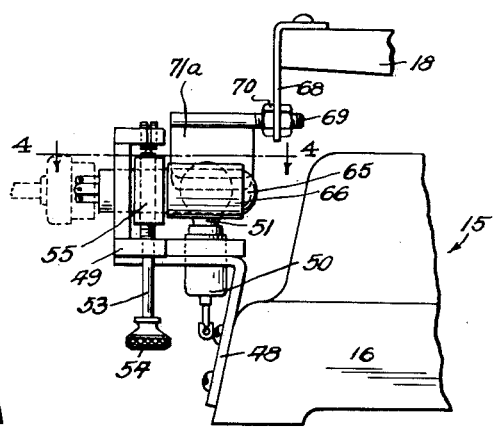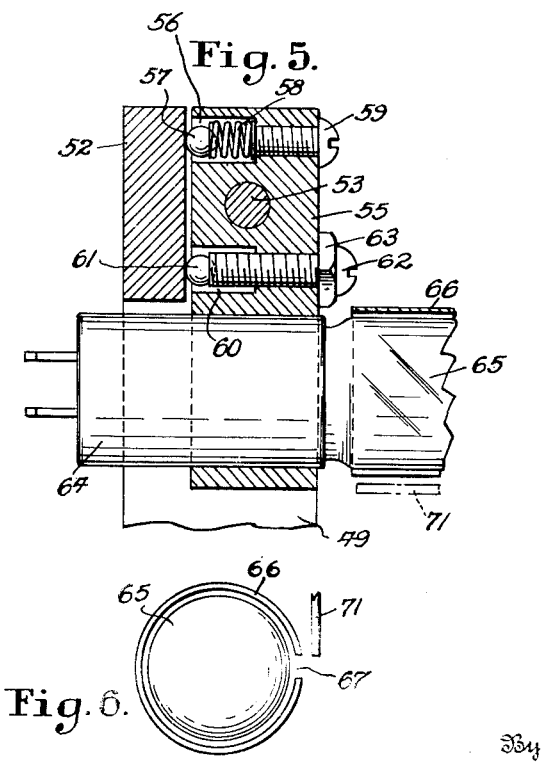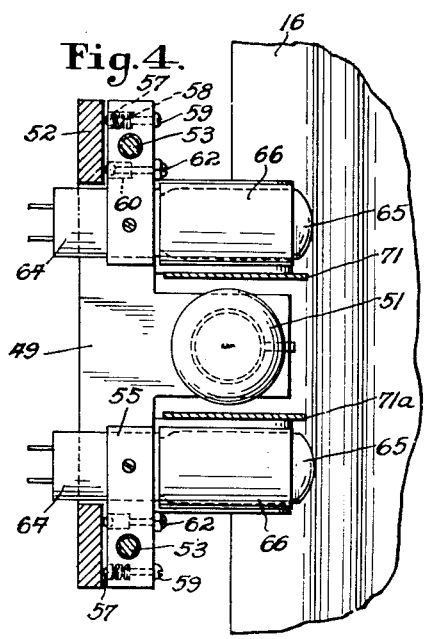

Aug. 24, 1954 W. J. SCHIESER ET AL 2,687,272
AUTOMATIC CONTAINER FILLING AND WEIGHING APPARATUS
Filed June 26, 1948 3 Sheets-Sheet 3

Inventors
Warren J. Schieser &
John F. Kelley

By M. S. McDowell
Attorney

Patented Aug. 24, 1954

2,687,272

UNITED STATES PATENT OFFICE 2,687,272

AUTOMATIC CONTAINER FILLING AND WEIGHING APPARATUS

Warren J. Schieser and John F. Kelley, Columbus, Ohio, assignors to The Exact Weight Scale Company, Columbus, Ohio, a corporation of Ohio Application June 26, 1948, Serial No. 35,334

8 Claims. (Cl. 249—63)

This invention relates to package filling and weighing apparatus, and has for an object to provide apparatus by which dry bulk materials may be delivered under regulated flow to the platter of a weighing scale, or a container for such materials removably mounted on said platter, whereby when a predetermined quantity or weight of such materials is deposited on the scale platter or in a container thereon, the flow of the materials to the scale from a source of supply is automatically shut off.

Another object of the invention is to provide apparatus of this character by which given amounts of materials handled thereby may be adequately weighed and packaged, the object being attained without involving manual operations other than initiating the operation of the apparatus when a given weighing cycle is started and when empty containers are substituted for filled and weighed containers.

A further object of the invention is to provide automatic material-feeding and weighing apparatus in which the material or materials being handled are fed from a hopper to the weighing platter of a scale at a relatively high rate of speed during the major portion of the period of travel of the material from the hopper to the scale, and a reduced rate of travel (dribble feed) just before the scale reaches a position of balance, whereby to combine both speed and high accuracy in completing automatically the weighing cycles.

A still further object is to provide apparatus of this nature in which the feeding and weighing operations are controlled through the cooperation of a light-sensitive switch responsive to the pivotal movement of a scale beam, the switch serving to actuate associated electrical circuits for reducing the rate of travel of material advancing to the scale as the scale approaches balance, and finally discontinuing such travel when the scale arrives at balance.

In accordance with the present invention, apparatus is utilized involving a hopper in which dry bulk materials to be weighed and packaged are placed. The hopper is provided in the bottom thereof with an outlet which is disposed in registration with one end of a material conveying chute or feeder, by means of which material discharged from the hopper is conducted to a container placed on the commodity receiver or platter of an even balance type of scale, the scale including a pivotally movable beam supporting at one end thereof the commodity platter and at the other end thereof a known weight or counterpoise receives. The hopper and the feeder chute are provided with associated electrical means for imparting rapid vibratory motion thereto whereby to control the flow or travel of the materials to be weighed from the hopper and through its associated chute to the scale, the operation of the apparatus being initiated by a manually actuated switch.

The invention further consists in the provision of a light-sensitive switch mechanism involving photoelectric cells arranged between a light source, and wherein the pivoted beam of the scale, or an element actuated thereby, is adapted to intercept the light beams emanating from said source to control the action of the electro-responsive vibrating means for governing material flow through the hopper and feeder chute, the operation of the photoelectric cells being such that when the scale beam approaches a position of balance, in which the weight of the materials applied to the scale is approximately that of the known weight on the scale, a rapid main feed of the material from said hopper through the chute is reduced and thereafter a slower rate of feed, known in the art as a dribble feed, obtains until the scale beam is exactly in balance. When exact balance is reached, the photoelectric cell units operate to interrupt current flow to the elements vibrating the hopper and chute to discontinue automatically the flow of the materials to the scale, thus enabling a filled and weighed container to be removed from the scale and an empty container substituted in lieu thereof for the commencement of a following weighing cycle.

For a further understanding of additional objects, advantages and nature of the invention, reference is to be had to the following description and the accompanying drawings, wherein:

Fig. 2 is an end elevational view of the weighing scale of the apparatus and disclosing more particularly the light-sensitive switch, including the photoelectric cell units employed in conjunction therewith;

Fig. 3 is a side elevational view of the apparatus disclosed in Fig. 2;

Fig. 4 is a horizontal sectional view taken on the plane indicated by the line 4—4 of Fig. 3;

Fig. 5 is an enlarged horizontal sectional view of the structure shown at the top of Fig. 4;

Fig. 6 is an end elevational view illustrating one of the slotted casings in which one of the photoelectric cells is mounted;

Figure 1:
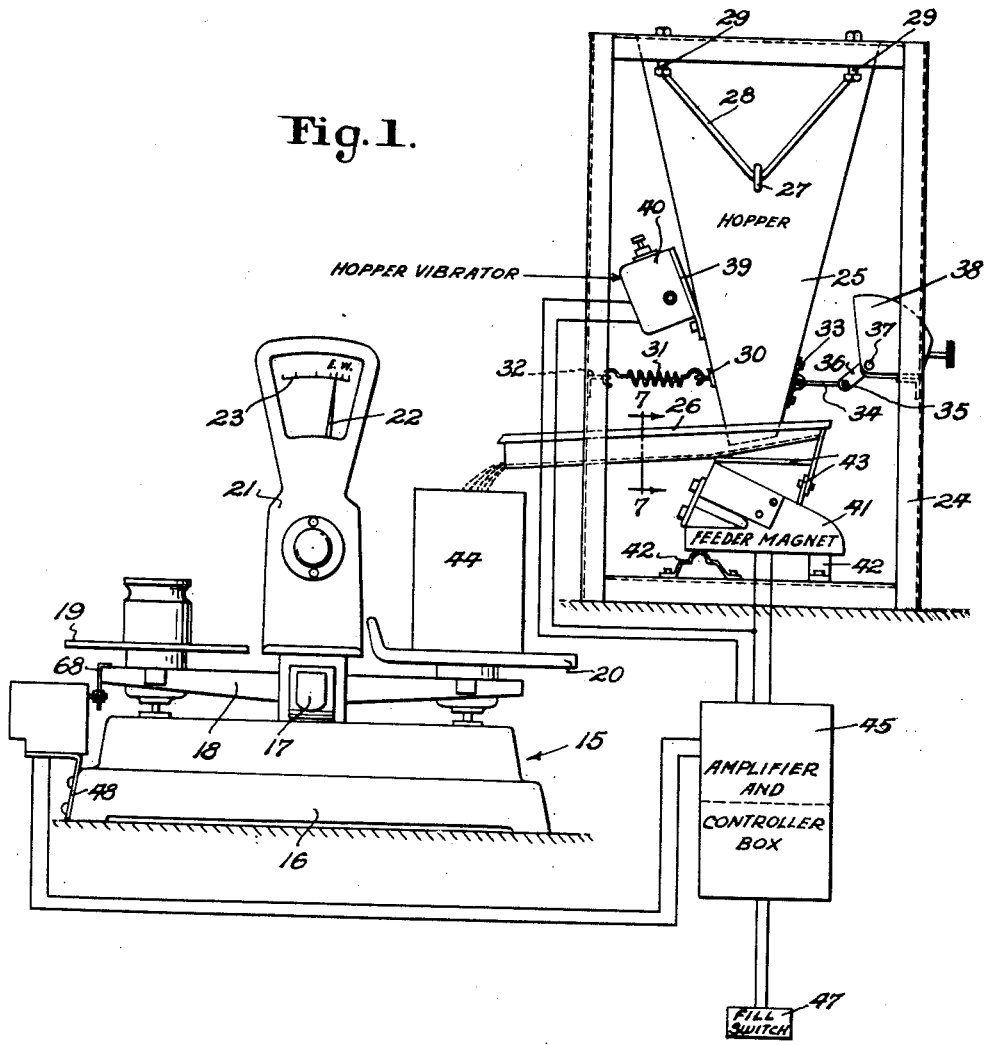
Fig. 1 is a front elevational view of package filling and weighing apparatus constructed in accordance with the present invention.

Referring more particularly to the drawings, the numeral 15 designates a weighing scale, which in this instance has been depicted as being of the even balance type, although other types of scales may be utilized within the purview of the invention. The scale embodies a base 16 which pivotally supports, as at 17, the center of an oscillatory beam or lever 18. The outer ends of the lever carry a known counterpoise receiver or platter 19 and a commodity or unknown weight receiver or platter 20. The base of the scale between said platters supports an upstanding indicator tower 21, in which is mounted a movable indicator hand 22, the end of the hand being movable over a stationary graduated surface 23. The movement of the hand is affected in a multiplied manner from the beam 18, so that slight variations in position of the beam from balance may be readily noted by viewing the indicator.

Suitably supported adjacent to the scale is a frame 24 which carries a hopper 25 for the reception of dry bulk materials to be weighed. Advantageously, the hopper may be of conical or funnel-shaped formation and has provided in the lower part thereof a restricted outlet which is arranged within or immediately over a feeding chute 26. In this instance, the hopper is provided at its front and back with eyes 27 which receive V-shaped bails 28, the latter having their upper ends secured as at 29 to the frame 24. The hopper is thus suspended by the bails for limited vibratory or rocking movement.

Toward its lower end, the hopper carries an eye member 30 to which is secured one end of a coil spring 31, the opposite end of the spring being anchored as at 32 on the frame 24. Immediately opposite the eye member 30, the hopper has fastened thereto a bracket 33 which is connected with one end of a link 34, the opposite end of the link being pivoted as at 35 on the outer end of an arm 36, which is pivotally mounted as at 37 on a bracket member 38 stationarily positioned on the frame 24. Above the spring 31, the side of the hopper carries a resilient tongue 39 on which is mounted an electrically actuated vibrating unit 40. By this unit, and when the same is energized, rapidly occurring vibrations are imparted to the hopper to produce a controlled positive flow of materials to be weighed thereon and into the chute 26.

Figure 7:
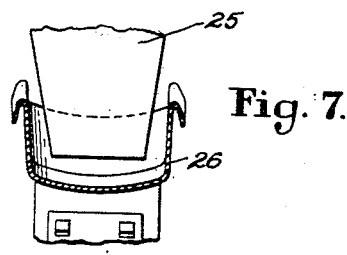
Fig. 7 is a transverse sectional view on the line 7—7 of Fig. 1.

Similarly, the chute or feeder 26, which comprises a trough-shaped length of metal, as shown in Figs. 1 and 7, is supported on a second electro-responsive vibrator 41, the latter being mounted on the resilient frame-carried supports shown at 42, while the casing of the vibrator is connected as at 43, with the material-receiving end of the chute. When energized, the vibrator causes materials deposited in the chute to be advanced forwardly and longitudinally thereof at a controlled rate of travel, so that such materials may be delivered, for example, to a container 44 removably positioned on the commodity receiver 20 of the scale, as in Fig. 1.

The apparatus further involves a control box 45 in which electro-responsive devices, hereinafter more fully described, are mounted for controlling the electrical circuits extending to the vibrators 40 and 41. The control box may be provided with a manually operated switch 47 which, when actuated, affects the closure of the operating circuits for the hopper and feeder vibrating units to cause material flow to the scale. In a manner to be presently explained, when the operation of the apparatus is initiated, the material travels from the hopper and through the associated chute or feeder at its maximum rate of travel, since it is desired to fill a container 44 as rapidly as possible until a predetermined weight and quantity of material is introduced into the container.

When, through the operation of the weighing scale, the materials delivered to a given container approach a predetermined weight, the intensity of the vibrations imparted to the hopper and chute is reduced, whereby to impart to the materials flowing toward the container a lower rate of travel, known colloquially as a dribble feed. This reduced rate of travel of the materials is maintained until the scale beam or lever is in true balance, with the indicator hand pointing to the zero or exact weight position on the graduated surface 23, at which time the operation of the vibrator unit is arrested and material flow to the scale abruptly shut off. The filled and weighed container may then be removed from the scale and an empty container substituted therefor; after which the feeding and weighing operation is repeated through the actuation of the manual switch 47.

In securing the automatic control and stopping of the feeding mechanism, we have provided the base of the scale, preferably at one end thereof, with a pair of supporting brackets 48, as shown in Figs. 2 and 3. The horizontal portions of these brackets carry a platform 49 on which is supported a socket fixture 50 for the reception of a removable incandescent lamp 51 which constitutes a light source for a light sensitive switch mechanism now to be decribed.

The platform 49 has secured thereto at its ends upright bracket extensions 52 in which are journaled vertically disposed screws 53, the latter being provided at the ends thereof with manipulating knobs or wheels 54. The threaded shanks of the screws 53 are received within correspondingly threaded bores provided in a pair of vertically adjustable cell carriers 55, which, through the actuation of the screws 53, may be adjusted vertically relative to the bracket extensions 52. To maintain the adjustment of the carriers 55, the latter, as shown in Fig. 5, are formed with sockets 56 for the reception of balls 57 which engage the inner surfaces of bracket extensions 52. Such engagement for each ball is effected by a coil spring 58 mounted in a socket 56 and arranged between the associated ball and one end of a screw 59 threaded into said socket. Also, each carrier is formed with a second inwardly disposed socket 60, which receives a ball 61 which is pressed against the inner face of an associated bracket extension 52 by means of a screw 62, the threaded shank of the latter including a lock nut 63. By this mechanism, the photocell carriers may be accurately adjusted with respect to the light source or lamp 51, and such adjustments maintained against displacement forces.

The inner ends of the carriers 55 are formed with openings for the reception of socket bases 64 provided on photoelectric cells or tubes 65, the latter being horizontally arranged with their glass shells positioned in opaque sleeves 66, the latter being rotatably received on the glass shells of said tubes for rotation about their longitudinal axes, whereby to adjust the positions of longitudinal slots or light apertures 67 provided in said sleeves with respect to the light sensitive surfaces within the cells or tubes. The scale lever or beam 18 carries at one end thereof a fixed depending bracket 68 which is adapted to oscillate in unison with the beam or lever.

The lower end of the bracket 68 carries a pair of threaded rods 69 which are held in connection with the bracket 68 by means of nuts 70, and from these rods there depends a pair of light-intercepting shutters 71. It will be noted by reference to Fig. 2 that one of these shutters (71a) possesses a greater height measurement than the other so that it will intercept light beams passing to one of the photoelectric cells or tubes ahead of the other shutter. Thus when the scale beam approaches balance, the shutters 71a will arrest light travel to the photoelectric cell or tube 65 governed thereby in order to reduce the activity of the hopper and feeder vibrators to retard the rate of travel of the materials undergoing weighing to the scale, thus causing the dribble feed action. When the scale reaches true weight, the second shutter 71 then intercepts light travel between the source 51 and its associated photoelectric cell or tube, resulting in the interruption of current flow to the hopper and feeder vibrators and discontinuing the weighing operation.

Figure 8:
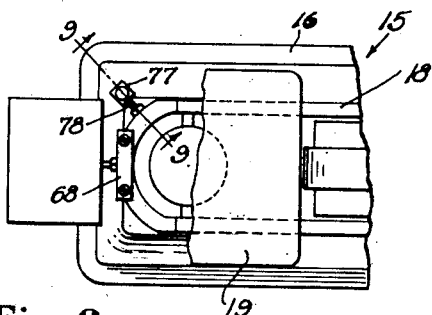
Fig. 8 is a detail top plan view of a portion of the weighing scale disclosing the supplemental spring flex means.
Figure 9:
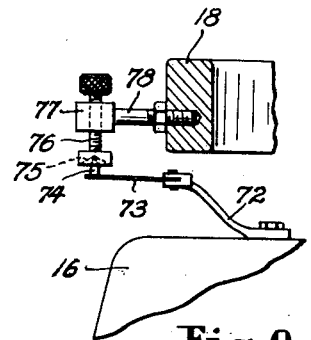
Fig. 9 is a sectional view on the line 9—9 of Fig. 8.

Preferably, and as shown in Figs. 8 and 9, the base of the scale at one end thereof is provided with a bracket 72 to which is secured one end of a flexible metallic reed 73. The outer or free end of the latter carries a pin 74 having a pointed upper end which is received within a conical socket 75 provided in the lower end of a set screw 76, the latter being threaded in a bore provided in a head 77 formed on the outer end of a rod 78, the latter having the inner end thereof threaded for reception in a correspondingly formed bore provided in the scale beam or lever 18.

The reed or spring flex 73 applies a slight resilient force to the scale beam or lever tending to elevate the end of the lever with which the reed engages during the major portion of the container-filling operation on the scale. This is done in order to expedite as much as possible the high rate of travel of the materials being fed to the scale. However, when the scale lever approaches balance, or upon initiation of the dribble feed, the reed will have reached its uppermost region of flexing so that it becomes mechanically separated from the lower end of the screw 76, in order not to affect or interfere with the final weighing action. By the pin and socket construction 74 and 75, this device is freed largely from dust or other material deposits. It will be understood that apparatus of this character is often placed in locations where dust or other fine particles of material are prevalent in the atmosphere, and which would be apt to interfere with the operation of sensitively constructed parts, as the reed 73 or the adjustable mountings for the photoelectric cells.

Figure 10:
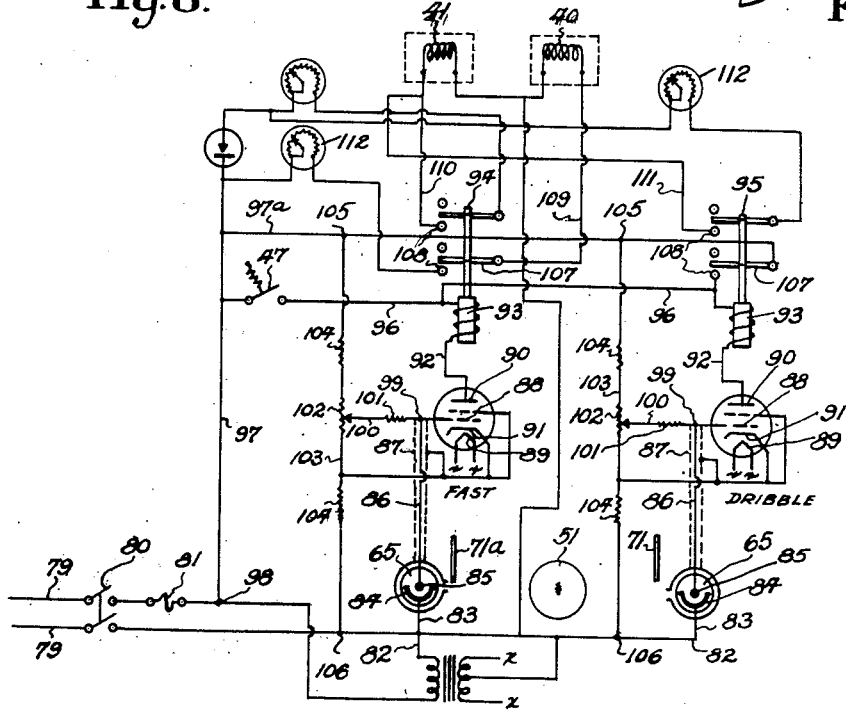
Fig. 10 is a diagrammatic view of the electrical circuits utilized in our improved apparatus.

In Fig. 10, the electrical apparatus mounted in the control box 45 has been diagrammatically illustrated. Current enters the box through the leads 79. Current may be obtained from any suitable commercial source and may comprise 60-cycle alternating current on 110, 220 or 440 voltage. The leads 79 include a master switch 80 and a control fuse 81. One of the leads 79 has connected therewith, as at 82, extensions 83 which lead to the light-sensitive targets 84 of the photoelectric cells or tubes 65. The central electrodes 85 of these cells or tubes are joined with conductors 86 which extend through armored sheathings 87 to the grids 88 of a pair of electronic tubes or valves of the thyratron type, such tubes being of the type now known commercially as GL 502–A. The filaments of these tubes are indicated at 89 and the plates thereof at 90 and 91. From the plates 90, conductors 92 extend to the field coils 93 of a pair of solenoid-type relays 94 and 95. From the coils 93, conductors 96 extend to a conductor 97 which is joined as at 98 with one of the leads 79. The starting switch 47 advantageously may be disposed in one of the conductors 96 adjacent to the conductor 97.

Each of the conductors 86 is joined as at 99 with a conductor 100 which leads to a grid 88. The conductors 100 include fixed resistances 101 and variable resistances 102, the latter being shown as included in conductors 103 in which are also embodied fixed resistances 104. The conductors 103 are joined as at 105 to the conductor 97a, and at 106 to one of the conductors 79.

The starting switch 47 is of the manually operated spring-pressed type which, when closed, initially energizes the coils 93 of the solenoid switches 94 and 95, these coils remaining energized through the operation of shunt circuits when the switch 47 is released and returns automatically to its open position. The energizing of the relays 94 and 95 moves the switch arms 107 thereof into engagement with fixed contacts 108 from which conductors 109 and 110 extend from the solenoid 94 and conductor 111 from the contacts of the relay 95. The conductor 109 extends to the vibrator 40 of the hopper. Conductor 110 extends to the feeder 41 to produce maximum vibration on the part thereof to attain the high feeding speed of the materials handled thereby to the scale, while the conductors 111 extend to the vibrating motor of the feeder chute to produce a low rate of vibration necessary for the dribble feed.

The conductors leading from the solenoid switches may include half-wave rectifiers 112 for converting the alternating current to direct current desirable in the operation of the vibrating motors. The sustained operation of the apparatus continues until the shutter 71a arrests or intercepts light travel from the light source 51 to the photoelectric cell or tube 65, at which time the solenoid switch 34 is deenergized to discontinue the operation of the hopper vibrator and high speed vibration on the part of the feeder chute. Due to the position of the shutter 71, the switch 95 remains closed, providing the dribble feed from the chute onto the scale, and this dribble feed is continued until the shutter 71 intercepts the path of light travel to its photoelectric cell or tube, when the weighing operation is thereby terminated. Through the adjustment of the rheostats 102, the speed of flow of the materials may be regulated. The starting switch may be foot controlled by the operator of the apparatus, or may be the hand operated type.

We claim:

1. In an apparatus of the class described, means for feeding material controlled by a plurality of electrical vibrators, an electrical circuit for supplying current to actuate the vibrators connected therein, a plurality of relay switches in the circuit adapted to make and break current flow to the vibrators, a plurality of photoelectric cells including a common light source to deenergize the relay switches when the light source is interrupted, and means for interrupting the light source to one of the cells while the light source to the other cell remains uninterrupted, whereby the rate of feeding the material may be automatically changed when the light source to one cell is interrupted and completely discontinued when the light source to both cells is interrupted.

2. In an apparatus for automatically feeding and weighing material, a scale, a hopper, a chute for feeding material from the hopper to the scale, an electrical vibrator carried by the hopper to rock the same, a second electrical vibrator carried by the chute to vibrate the same, an electrical circuit for supplying current to actuate both electrical vibrators, a relay switch in the circuit adapted to make and break current flow to both vibrators, a second relay switch in the circuit adapted to make and break current to the second electrical vibrator carried by the chute, photoelectric cell means adapted to deenergize the first named relay switch, a second photoelectric cell means adapted to deenergize the second named relay switch, a light source common to both photoelectric cell means mounted therebetween, and means carried by the scale means to interrupt the light source to the first named cell means without interrupting the light source to the second cell means, whereby rate of feed of material from the hopper and chute may be automatically varied.

3. In an automatic material-feeding and weighing apparatus, a scale including a movable balance beam for weighing materials; a storage hopper for materials to be weighed, said hopper having a relatively restricted discharge opening; a feed chute arranged to feed materials discharged from the hopper to said scale, said chute being inclined downwardly toward said scale at an angle insufficient to permit gravitational flow of materials discharged from said hopper to said scale in the absence of vibrating of said chute; a first electrically actuated vibrating means energizable to vibrate said hopper; a second electrically actuated vibrating means energizable to vibrate said feed chute at a first frequency providing for rapid feeding of materials and at a second frequency providing for slow feeding of materials; means to energize said first and second vibrating means to provide for rapid feeding of materials over said chute; light-sensitive switch means responsive to the movement of the balance beam of said scale to a position approaching a balanced position for simultaneously deenergizing said first vibrating means and conditioning said second vibrating means to vibrate said chute at said second frequency; and other light-sensitive switch means responsive to the movement of the balance beam to an exact balance position for deenergizing said second vibrating means.

4. In an automatic material-feeding and weighing apparatus, a weighing scale having a movable balance beam arranged to balance a receiving package thereon against a predetermined weight; a storage hopper for materials to be weighed and having a relatively restricted discharge opening arranged to discharge materials from said hopper in response to vibration of said hopper; a feed chute arranged to conduct materials discharged from said hopper to a package positioned on said scale only in response to vibration of said chute; a first electrically energizable vibrator connected with said hopper for vibrating the same; a second electrically energizable vibrator connected with said feed chute to vibrate the same at variable frequencies, whereby to control the rate of flow of materials over said chute; means electrically connected with said first and second vibrators for initially energizing both of said vibrators to cause materials contained in said hopper to be discharged upon said chute and to flow over said chute at relatively high speeds; means responsive to the movement of the balance beam of said scale to a position approaching a balanced position for deenergizing said first vibrator to arrest discharge of materials from said hopper and for reducing the frequency of vibration of said second vibrator, whereby to reduce the rate of flow of materials over said chute; and other means responsive to the movement of the balance beam of said scale to a balanced position for deenergizing said second vibrator.

5. In apparatus for weighing free-flowing bulk materials, a weighing scale having a pivotally movable balance beam carrying at one end thereof a receiver for materials to be weighed and at its opposite end a counterpoise receiver, a frame, a vertically positioned material-holding hopper, means uniting said hopper with said frame for vibratory movement to effect regulated movement of material contained within the hopper through a restricted outlet in the bottom thereof, an electrically actuated vibratory motor for imparting vibratory movement to said hopper, a single substantially horizontally arranged material-conveying chute positioned in said frame below and having a receiving end disposed in immediately adjacent vertically registering relation to the restricted discharge end of said hopper, the opposite delivery end of said chute being disposed to discharge materials conveyed by the chute into said scale beam carried receiver, a second electrically energized vibratory motor, the latter being mounted on said frame in supporting relation with said chute, an operating circuit for the hopper motor having a scale mounted light sensitive switch, an operating circuit for said chute motor including a light-sensitive switch, a light source operative to direct light beams on said switches and light beam intercepting shutter means carried by said scale beam, said shutter means being movable with the scale beam to open said motor-operating circuits when said beam attains a position of weight balance.

6. In weighing apparatus as defined in claim 5 and further characterized by relatively arranging said light-sensitive switches and said shutter means, so that the switch controlling the circuit of the hopper motor is actuated in advance of the switch controlling the circuit of the chute motor in deenergizing said circuits.

7. Apparatus for feeding and weighing free-flowing bulk materials, comprising: a weighing scale having a base and a pivoted balance beam mounted on the base, a vibratory hopper for materials, an electrically energized motor for imparting vibration to said hopper, said motor including an operating circuit and a switch for said motor including a photoelectric cell, a vibratory chute receiving material from said hopper and transferring the same to said scale beam, an electrically energized motor for imparting vibration to said chute, an operating circuit for said chute motor including a switch having a photoelectric cell, a light source disposed between said photoelectric cells to direct light thereon, and light-intercepting shutters carried by said scale beam and movable with the latter so that when said beam attains substantially a position of weight balance light from said source on said photocells is interrupted to open said motor circuits.

8. Material-feeding and weighing apparatus as defined in claim 7, and wherein the construction is further characterized by the provision of bracket means mounted on the scale base, and relatively adjustable holders for the photoelectric cells mounted in said bracket means, the adjustment of said holders controlling the timing of the cells in their circuit-opening and closing response to the movement of said beam mounted shutters.

References Cited in the file of this patent

UNITED STATES PATENTS

| Number | Name | Date |
|---|---|---|
| 1,729,192 | Smith et al. | Sept. 24, 1929 |
| 1,777,670 | Hausman | Oct. 7, 1930 |
| 2,051,781 | Brown | Aug. 18, 1936 |
| 2,055,730 | Rees | Sept. 29, 1936 |
| 2,058,775 | Cundall | Oct. 27, 1936 |
| 2,071,443 | Weckerly | Feb. 23, 1937 |
| 2,101,561 | Rapp | Dec. 7, 1937 |
| 2,169,465 | Hadley | Aug. 15, 1939 |
| 2,207,885 | Howard | July 16, 1940 |
| 2,266,906 | Rapp | Dec. 23, 1941 |
| 2,273,330 | Robinson | Feb. 17, 1942 |
| 2,303,140 | Sackett | Nov. 24, 1942 |
| 2,348,372 | Weckerly | May 9, 1944 |

FOREIGN PATENTS

| Number | Country | Date |
|---|---|---|
| 362,702 | Great Britain | Dec. 10, 1931 |